United States Patent
Li et al.

(10) Patent No.: US 11,940,712 B2
(45) Date of Patent: Mar. 26, 2024

(54) ACOUSTO-OPTIC BEAM STEERING DEVICE, AND METHODS OF MAKING AND USING THE SAME

(71) Applicant: REGENTS OF THE UNIVERSITY OF MINNESOTA, Minneapolis, MN (US)

(72) Inventors: Mo Li, Minneapolis, MN (US); Huan Li, Minneapolis, MN (US); Qiyu Liu, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 275 days.

(21) Appl. No.: 17/602,415

(22) PCT Filed: Apr. 10, 2020

(86) PCT No.: PCT/US2020/027621
§ 371 (c)(1),
(2) Date: Oct. 8, 2021

(87) PCT Pub. No.: WO2020/210594
PCT Pub. Date: Oct. 15, 2020

(65) Prior Publication Data
US 2022/0206358 A1    Jun. 30, 2022

Related U.S. Application Data

(60) Provisional application No. 62/832,528, filed on Apr. 11, 2019.

(51) Int. Cl.
*G02F 1/335* (2006.01)
*G01S 7/481* (2006.01)
(Continued)

(52) U.S. Cl.
CPC ............ *G02F 1/335* (2013.01); *G01S 7/4817* (2013.01); *G01S 17/02* (2013.01); *G01S 17/42* (2013.01); *G02B 26/0858* (2013.01); *H01S 3/30* (2013.01)

(58) Field of Classification Search
None
See application file for complete search history.

(56) References Cited

U.S. PATENT DOCUMENTS 4,208,091 A    6/1980    Cheo et al.
4,348,075 A    9/1982    Gottlieb et al.
(Continued)

OTHER PUBLICATIONS

Römer., G.R.B.E., and P. Bechtold, "Electro-optic and Acousto-optic Laser Beam Scanners," Phys. Procedia 56, 29-39 (2014).
(Continued)

*Primary Examiner* — Jerry Rahll
(74) *Attorney, Agent, or Firm* — CHRISTENSEN O'CONNOR JOHNSON KINDNESS PLLC

(57) ABSTRACT

The present disclosure provides an acousto-optic device comprising an acousto-optic layer, an electromagnetic radiation source, and an acoustic source. In an embodiment, the acousto-optic layer has a substantially planar shape defining an x-y plane and functions as an optical waveguide to optical waves and as an acoustic waveguide to acoustic waves propagating in the x-y plane. In an embodiment, the electromagnetic radiation source is optically coupled to the acousto-optic layer and configured to deliver electromagnetic radiation therein. In an embodiment, the acoustic source is acoustically coupled to the acousto-optic layer and configured to deliver acoustic energy therein and is configured to adjust a wavelength of the acoustic energy. In an embodiment, the electromagnetic radiation source and the acoustic energy source are positioned to provide an intersection between the electromagnetic radiation and the acous-
(Continued)

tic energy, which at least partially scatters light from the intersection out of the x-y plane.

20 Claims, 8 Drawing Sheets

(51) Int. Cl.
  *G01S 17/02* (2020.01)
  *G01S 17/42* (2006.01)
  *G02B 26/08* (2006.01)
  *H01S 3/30* (2006.01)

(56) References Cited

U.S. PATENT DOCUMENTS

| | | | |
|---|---|---|---|
| 4,470,661 A | | 9/1984 | Matsumoto |
| 4,595,253 A | | 6/1986 | Yamashita et al. |
| 4,738,501 A | * | 4/1988 | Sunagawa ............... G02F 1/335 250/585 |
| 4,960,322 A | | 10/1990 | Khoshnevisan et al. |
| 5,223,971 A | | 6/1993 | Magel |
| 2005/0030840 A1 | | 2/2005 | Hagood et al. |
| 2015/0338718 A1 | | 11/2015 | Zhang et al. |

OTHER PUBLICATIONS

McManamon, P.F., et al., "A Review of Phased Array Steering for Narrow-Band Electrooptical Systems," Proc. IEEE 97, 1078-1096 (2009).
McManamon, P.F., "A review of non mechanical beam steering options," in LEOS 2008—21st Annual Meeting of the IEEE Lasers and Electro-Optics Society (IEEE, 2008), pp. 575-576.
Hum, S.V., et al., "Reconfigurable Reflectarrays and Array Lenses for Dynamic Antenna Beam Control: A Review," IEEE Trans. Antennas Propag. 62, 183-198 (2014).
Tadesse, S.A., et al., "Acousto-optic modulation of a photonic crystal nanocavity with Lamb waves in microwave K band," Appl. Phys. Lett. 107, 201113 (2015).
Li, H., et al., "Nanophotonic cavity optomechanics with propagating acoustic waves at frequencies up to 12 GHz," Optica 2, 826 (2015).
Li, H., et al., "Integrated Two-Dimensional Free-Space Acousto-Optics on Suspended Membranes," in Conference on Lasers and Electro-Optics (OSA, 2017), vol. Part F41-C, p. STu3N.4.
Poulton, C.V., et al., "Coherent solid-state LIDAR with silicon photonic optical phased arrays," Opt. Lett. 42, 4091 (2017).
Poulton, C.V., et al., "Large-scale silicon nitride nanophotonic phased arrays at infrared and visible wavelengths," Opt. Lett. 42, 21 (2017).
Hulme, J.C., et al., "Fully integrated hybrid silicon two dimensional beam scanner," Opt. Express 23, 5861 (2015).
International Search Report with Written Opinion dated Jul. 6, 2020, issued in corresponding International Application No. PCT/US2020/027621, filed Apr. 10, 2020, 10 pages.
Young, E.H., et al., "Design Considerations for Acousto-Optic Devices," Proceedings of the IEEE, (69)1: 54-64 (1981).
Attard, A. E., and Brian I. Heffner, "Diffraction of light by acoustic waves on a membrane," Optics Letters, (6)5: 225-226 (1981).
Li, H., et al., "Electromechanical Brillouin Scattering in Integrated Planar Photonics," APL Photonics, Aug. 2019, 9 pages.
"Infrared (IR) Lasers," Seminex Corporation, <http://seminex.com/infrared-ir-lasers/> [retrieved Apr. 13, 2022], 7 pages.
International Preliminary Report on Patentability dated Jul. 6, 2020, issued in corresponding International Application No. PCT/US2020/027621, filed Apr. 10, 2020, 8 pages.

* cited by examiner

ACOUSTO-OPTIC BEAM STEERING DEVICE, AND METHODS OF MAKING AND USING THE SAME

CROSS-REFERENCES TO RELATED APPLICATIONS

This application is a National Stage of co-pending International Patent Application No. PCT/US2020/027621, filed Apr. 10, 2020, which claims the benefit of U.S. Provisional Patent Application No. 62/832,528, filed on Apr. 11, 2019, now expired, the contents of each of which are incorporated herein by reference in their entirety.

STATEMENT OF GOVERNMENT LICENSE RIGHTS

This invention was made with government support under Grant Nos. 1307601 and 1641109, awarded by the National Science Foundation. The government has certain rights in the invention.

BACKGROUND

Optical beam steering, also known as beam scanning, or beam deflection, refers to controlling the propagation of optical beams into desired directions. It has been the focus of extensive research and development (R&D) efforts both in academia and industry since the 1970s. Beam steering devices have found a wide spectrum of scientific, industrial, commercial and military applications, including fluorescence microscopy, optical storage, laser printers, display, sensing and laser material processing. Recently, the explosive development of Internet of Things (IoT), especially autonomous vehicles and drones, has spurred enormous and fast-growing demands for Light Detection and Ranging (LIDAR) and free-space optical (FSO) communications, which are important enabling technologies for IoT. Tremendous R&D opportunities and market for beam steering devices have emerged.

LIDAR is widely used on autonomous vehicles and drones to detect stationary or moving objects for avoidance or tracking. The basic operation principle of LIDAR, as shown in FIG. 1, is to emit an optical pulse and detect the returning pulse reflected from the objects. The distance to the detected object can be calculated from the time delay between the emission and the detection of the optical pulse. This is termed a time of flight (TOF) method. The laser beam is also scanned rapidly to resolve the shape of the object in order to determine its type, such as a pedestrian, a tree, or a moving vehicle. Therefore, important to the LIDAR operation is the capability to steer the optical beam with a high velocity, a high angular resolution, and a large angle range. (In the context of LIDAR, "angle range" is known as "field of view", or FOV.) By the same token, efficient, secure, and reliable FSO communications between fast-moving autonomous vehicles and drones, or other moving objects that require communication, also entail similar beam steering capabilities. In addition, low power consumption, small form factor and low manufacturing cost are always desirable for any beam steering devices.

There are myriad existing solutions for beam steering, which generally fall into four categories, namely, mechanical, electro-optic (EO), acousto-optic (AO) and thermo-optic (TO) beam steering. The pros and cons of various solutions have been compared in great details in review papers. Here, we only provide very general introductions of and comparisons between selected solutions. Generally, mechanical beam steering is a straightforward and matured technology, featuring a very large angle range, a high angular resolution, but very low velocity and large form factors. Beam steering based on Micro-Electromechanical Systems (MEMS), which are miniaturized, microscale mechanical devices, features significantly improved velocity and reduced form factors. However, MEMS beam steering is still quite slow compared with other solutions, due to its mechanical nature. In contrast, beam steering based on EO and AO effects, free from any mechanical moving parts, feature very high velocity, with the fastest solution being AO based. However, conventional EO and AO beam steering generally suffer from a small angle range. One exception of the EO beam steering is that based on liquid crystals (LCs). Compared with other EO solutions, EO LC can achieve a much larger angle range, meanwhile suffers from a much lower velocity. The performance of TO beam steering is generally comparable to that of EO LC and MEMS. Furthermore, EO, (including EO LC) AO and TO solutions naturally provide random-access capabilities, or point-and-hold capabilities, which are important for continuous and simultaneous multiple-object tracking, while mechanical and MEMS solutions generally operate in the raster-scan mode to achieve the highest possible steering velocity. Random-access operation for mechanical and MEMS solutions entails severe penalties on the steering speed due to component inertia.

BRIEF SUMMARY

To address these and other related challenges, the present disclosure provides acousto-optic devices and related methods of use and making the same.

Accordingly, in an aspect, the present disclosure provides an acousto-optic device comprising a first acousto-optic layer, a light source, and a first acoustic source. In an embodiment, the first acousto-optic layer has a substantially planar shape defining an x-y plane. In an embodiment, the first acousto-optic layer functions as an optical waveguide to optical waves propagating in the x-y plane. In an embodiment, the first acousto-optic layer functions as an acoustic waveguide to acoustic waves propagating in the x-y plane. In an embodiment, the light source is optically coupled to the first acousto-optic layer and configured to deliver light into the first acousto-optic layer propagating in the x-y plane. In an embodiment, the first acoustic source is acoustically coupled to the first acousto-optic layer and configured to deliver a first acoustic energy into the first acousto-optic layer propagating in the x-y plane. In an embodiment, the first acoustic source is configured to adjust a wavelength of the first acoustic energy. In an embodiment, the light source and the first acoustic source are positioned to provide an intersection between the light and the first acoustic energy. In an embodiment, the light at least partially scatters from the intersection out of the x-y plane.

In some cases, the first acousto-optic layer has an asymmetry about the x-y plane. In an embodiment, the first acousto-optic layer has a front face and a back face both oriented within the x-y plane. In an embodiment, the light emerging from the front face is in an amount that is at least 1% greater than the amount emerging from the back face due to the asymmetry of the first acousto-optic layer.

In another aspect, the present disclosure provides an acousto-optic device comprising a first acousto-optic layer, a non-visible electromagnetic radiation source, and a first acoustic source. In an embodiment, the first acousto-optic layer has a substantially planar shape defining an x-y plane. In an embodiment, the first acousto-optic layer functions as an optical waveguide to non-visible optical waves propagating in the x-y plane. In an embodiment, the first acousto-optic layer functions as an acoustic waveguide to acoustic waves propagating in the x-y plane. In an embodiment, the non-visible electromagnetic radiation source is optically coupled to the first acousto-optic layer and configured to deliver non-visible electromagnetic radiation into the first acousto-optic layer propagating in the x-y plane. In an embodiment, the first acoustic source is acoustically coupled to the first acousto-optic layer and configured to deliver a first acoustic energy into the first acousto-optic layer propagating in the x-y plane. In an embodiment, the first acoustic source is configured to adjust a wavelength of the first acoustic energy. In an embodiment, the non-visible electromagnetic radiation source and the first acoustic energy source are positioned to provide an intersection between the non-visible electromagnetic radiation and the first acoustic energy. In an embodiment, the non-visible electromagnetic radiation at least partially scatters from the intersection out of the x-y plane.

In another aspect, the present disclosure provides method of using an acousto-optic device. In an embodiment, the acousto-optic device is according to any embodiment of the present disclosure. In an embodiment, the method comprises directing light from a light source of the acousto-optic device and first acoustic energy from a first acoustic energy source of the acousto-optic device to intersection, thereby initiating scattering of the light causing at least a portion of the light to emerge from the front face. In an embodiment, the light is non-visible light. In an embodiment, the light is visible light.

In another aspect, the present disclosure provides a method of making an acousto-optic device according to an embodiment of the disclosure. In an embodiment, the method comprises fabricating and/or assembling components of the acousto-optic device and arranging them in the fashion described further herein.

DETAILED DESCRIPTION

Figure 1:
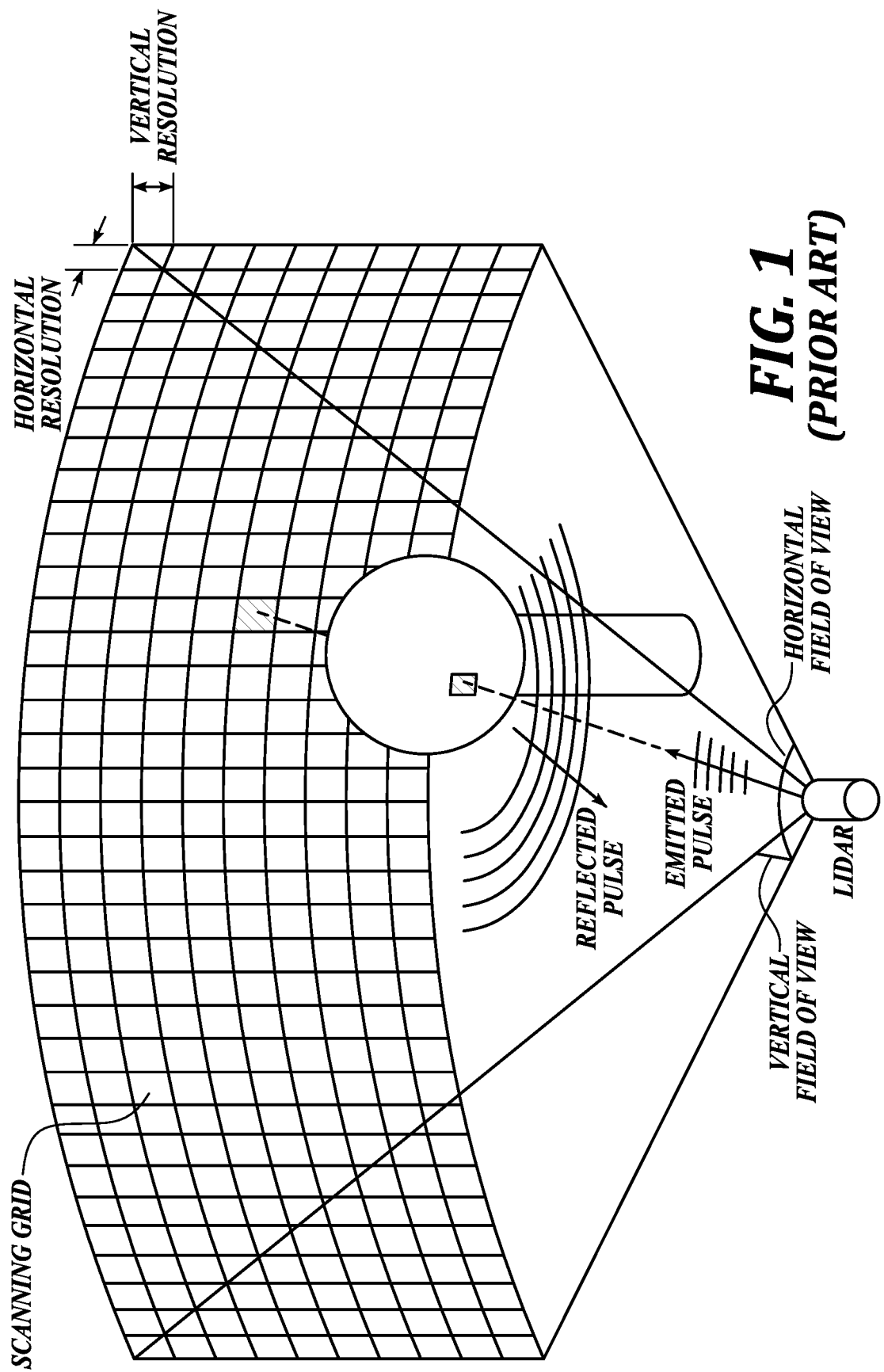
FIG. 1 is a schematic representation of Light Detection and Ranging (LIDAR) in use in detecting a distance of an object.

The present disclosure provides acousto-optic (AO) devices and related methods of use. The AO devices of the present disclosure provide many advantages over conventional beam steering devices.

In certain embodiments, the acousto-optic devices of the present disclosure have the fast velocity of the existing AO solutions, and further feature significantly increased angle range and angular resolution over conventional devices. Additionally, the AO devices of the present disclosure have relatively low power consumption, small form factor, and moderate manufacturing cost, which are a combination that has not been achieved with existing solutions.

Additionally, in certain embodiments, the AO devices of the present disclosure are configured to direct acoustic waves and directly scatter and steer optical waves into free space, instead of doing so in a plane of the AO device and coupling the optical beam into free space via conventional coupler technologies as in conventional solutions. In some embodiments, the emitted beam is well collimated, which eliminates the need for additional lenses.

As described further herein, in some embodiments, the AO device of the present disclosure includes a suspended thin membrane, such that Brillouin scattering is enhanced for low-power-consumption AO operation.

In an embodiment, the AO devices of the present disclosure include a stack of membranes of different materials. Such AO devices including stacks of, for example, alternating, different materials, are suitable for fine-tuning and enhancing device performance.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory" may also include other types of memory or combinations thereof.

Devices

In one aspect, the present disclosure provides an acousto-optic device. The acousto-optic device can include a first acousto-optic layer, a light source, and a first acoustic source.

The first acousto-optic layer can have a substantially planar shape defining an x-y plane. The first acousto-optic layer can function as an optical waveguide to optical waves propagating in the x-y plane. The first acousto-optical layer can function as an acoustic waveguide to acoustic waves propagating in the x-y plane. The first acousto-optic layer can have an asymmetry about the x-y plane. The first acousto-optic layer can have a front face and a back face, both oriented within the x-y plane.

The first acousto-optic layer can have a thickness of between 1 nanometer and 10 micrometers. The first acousto-optic layer can be suspended. The first acousto-optic layer can be affixed to a substrate via the back face. The substrate can be thermally conductive. The substrate can be non-reflective.

In some cases, the first acousto-optic layer can include at least two stacked layers. The at least two stacked layers can have a first layer of a first acousto-optic material and a second layer of a second acousto-optic material. The first and second acousto-optic materials can be different. The first or second acousto-optic material can be selected from the group consisting of lithium niobate, aluminum nitride, zinc oxide, silicon, and silicon dioxide. Each of the at least two stacked layers can have a thickness of between 1 nanometer and 1 micrometer. In certain cases, the at least two stacked layers can include a plurality of alternating stacked layers alternating between the first acousto-optic material and the second acousto-optic material.

The light source can be optically coupled to the first acousto-optic layer. The light source can be configured to deliver light into the first acousto-optic layer propagating in the x-y plane. The light source can be a laser diode.

The first acoustic source can be acoustically coupled to the first acousto-optic layer. The first acoustic source can be configured to deliver a first acoustic energy into the first acousto-optic layer propagating in the x-y plane. The first acoustic source can be configured to adjust the wavelength of the first acoustic energy. The first acoustic source can be configured and positioned to provide wavelengths and propagation directions sufficient to satisfy the phase-matching condition of acousto-optic Brillouin scattering, thereby scattering the light out of the x-y plane.

The light source and the first acoustic source can be positioned to provide an intersection between the light and the first acoustic energy. The light can be at least partially scattered from the intersection out of the x-y plane (i.e., having at least some component in the z-direction).

Figure 2A:
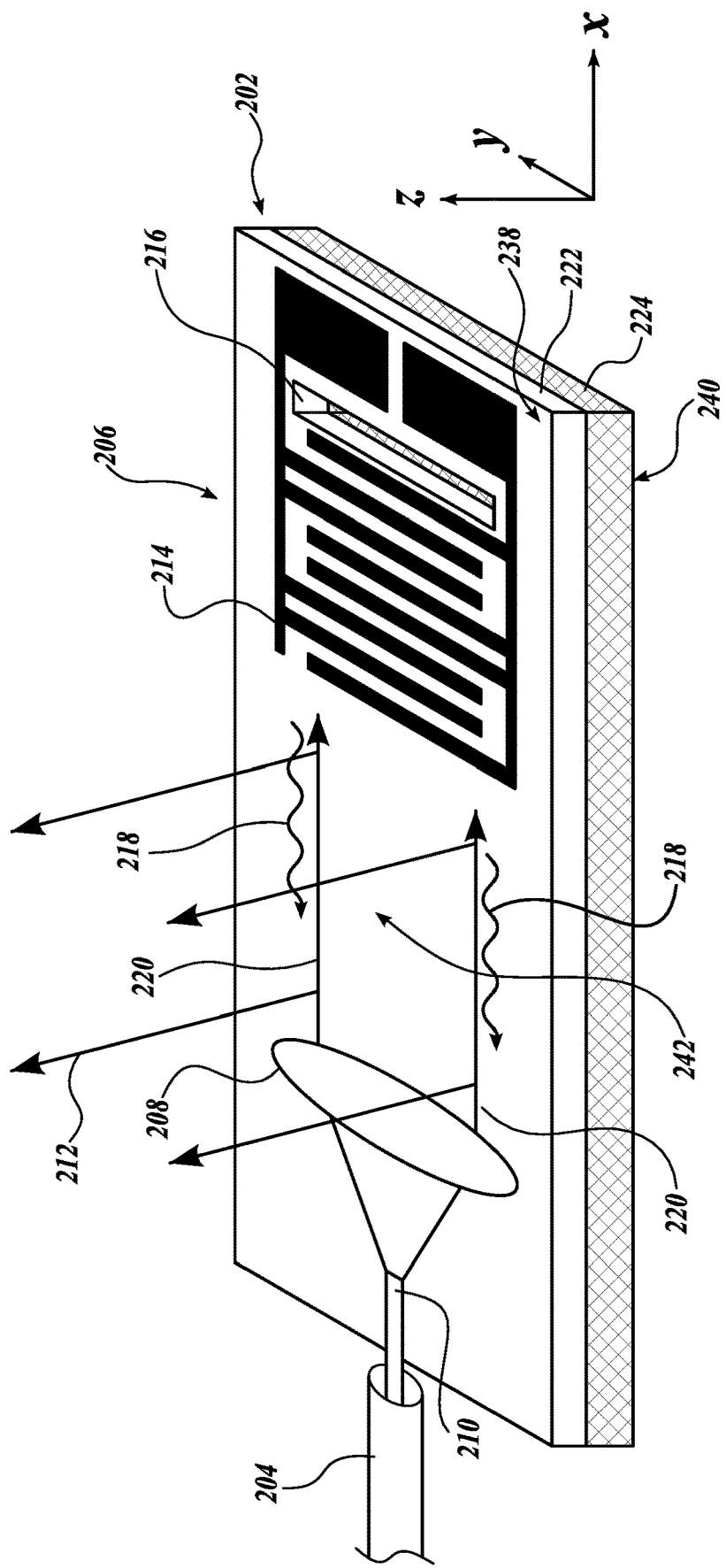
FIG. 2A is a schematic representation of a device, in accordance with an embodiment of the disclosure.
Figure 3A:
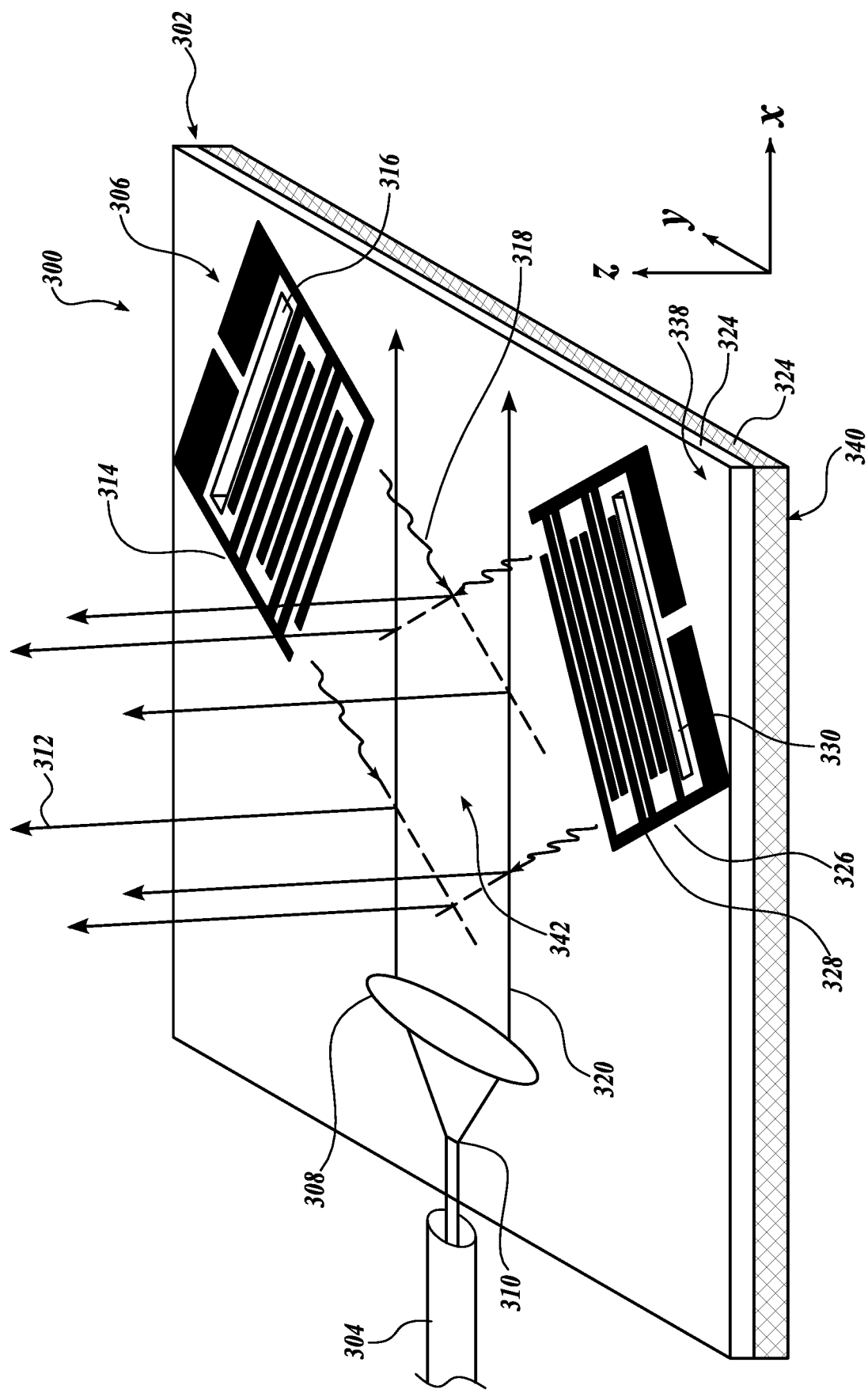
FIG. 3A is a schematic representation of another device, in accordance with an embodiment of the disclosure.

The acousto-optic device can optionally include a second acoustic source. One example of an acousto-optic device having only one acoustic source is shown in FIG. 2A and one example of an acousto-optic device having two acoustic sources is shown in FIG. 3A. The first and second acoustic sources can be configured and positioned to provide wavelengths and propagation directions sufficient to satisfy the phase-matching condition of acousto-optic Brillouin scattering, thereby scattering the light out of the x-y plane.

The second acoustic source can be positioned to deliver the second acoustic energy to the intersection, thereby providing the intersection between the light, the first acoustic energy, and the second acoustic energy.

The first and/or second acoustic source can be integrated into the first acousto-optic layer. The first and/or second acoustic source can comprise interdigital transducers disposed on a piezoelectric membrane. In cases where the first and/or second acoustic source is integrated into the first acousto-optic layer, the piezoelectric membrane can be the first acousto-optic layer. The first and/or second acoustic source can include an edge reflector. The edge reflector can be positioned to reflect a portion of the first and/or second acoustic energy from initially traveling away from the intersection to traveling toward the intersection.

An angle of emission of the light from the front face can be adjustable by tuning the wavelength of the first acoustic energy and/or the second acoustic energy.

The device can further include a lens configured to substantially collimate the light. The lens can be integrated into the first acousto-optic layer.

The acousto-optic devices described herein can have a preferential emission via the front face relative to the back face. This is one aspect of the devices of the present disclosure that distinguishes these devices from previous efforts and allows for directional delivery of the light described elsewhere herein without requiring reflection of light emitted from the back face. Such reflection of light emitted from a back face can negatively impact retention of phase information in the emitted light. The light emerging from the front face can be in an amount that is at least 1% greater than an amount emerging from the back face due to the asymmetry of the first acousto-optic layer, including but not limited to, an amount that is at least 50% greater, at least 100% greater, at least 500% greater, or at least 1000% greater than the amount emerging from the back face.

The light and acoustic sources can have various controllers that are typically associated with control of the output light and acoustic energy, as would be understood by those having ordinary skill in the optical and acoustic arts. The devices described herein, or broader systems that include the devices, can include a computer, processor, and/or memory having the ability to interface with the light and acoustic controllers to achieve the effects described herein, as would be understood by those having ordinary skill in the electronic device arts.

The present disclosure inherits the fast velocity of the existing AO solutions, and features significantly increased angle range and angular resolution, and simultaneously, low power consumption, small form factor and moderate manufacturing cost, which are a combination that has not been achieved with existing solutions.

As discussed further herein with respect to devices 200, 300, and 400 and FIGS. 2A, 2B, 3A, 3B, 4A-4C, the present disclosure provides an integrated acousto-optic (AO) device that is capable of emitting an optical beam into free space and steering its direction in one and/or two dimensions (1D or 2D). In an embodiment, such devices comprise a thin membrane, or a stack of thin membranes, such as of nanoscale thickness, that are capable of guiding both the optical and acoustic waves propagating in the plane of the device. The membrane(s) can be suspended, or on a substrate for mechanical support and heat sink. The membrane can be made of piezoelectric materials, or a layer in the stack of the membrane can be made of piezoelectric material. The wavelengths and the propagation directions of the acoustic waves are engineered to satisfy the phase-matching condition of acousto-optic Brillouin scattering, such that the optical waves are scattered out of the plane of the device by the acoustic wave and emitted into free space. ("Brillouin scattering" refers to the scattering of optical waves by acoustic waves via the acousto-optic effect.) The emission direction can be steered by tuning the wavelengths or frequency, as well as the propagation directions, of the acoustic waves. Especially, we have proposed several device configurations, shown in FIGS. 2A, 3A, and 4A-4C, which can steer the optical emission direction in 1D and/or 2D, by tuning the wavelength of one and/or two acoustic waves, respectively, such as without tuning their propagation directions.

The excitation and tuning of the guided optical and acoustic waves in the membrane can be achieved via existing technologies. For example, the optical waves can be generated by a laser diode, and converted into the desired guided mode via a combination of grating couplers, waveguides and integrated lenses. The acoustic waves can be generated electromechanically via interdigital transducers (IDTs) fabricated on piezoelectric membranes. The directions and wavelengths of the acoustic waves can be tuned by the designs of the IDTs and the frequencies of the radio-frequency (RF) electrical signals that drive the IDTs. In addition, acoustic reflectors and absorbers can also be incorporated to manipulate the acoustic waves.

Possible materials of the membranes include lithium niobate ($LiNbO_3$ or LN), aluminum nitride (AlN), zinc oxide (ZnO), silicon (Si) and silicon dioxide ($SiO_2$). By varying the materials and the thicknesses of the membranes, the device performance can be further fine-tuned and optimized. For example, with a membrane of a single material suspended in air, due to the mirror symmetry of such a structure, the emitted optical beams may go equally into both the upper and lower sides of the membrane, which is undesirable if single-sided beam emission is preferred. In contrast, a stack of LN and $SiO_2$ membranes can break the mirror symmetry, due to their different optical and acoustic properties, and suppress the optical emission into the undesired side of the device. The devices can be fabricated with standard nano-fabrication processes, such as those described in.

FIG. 2A shows an exemplary device 200 configuration, which is capable of steering the optical beam in 1D. As shown, the device 200 includes a first acousto-optic layer 202 having a substantially planar shape defining an x-y plane; a light source 204 optically coupled to the first acousto-optic layer 202 and configured to deliver light, in the form of a guided optical wave 220, into the first acousto-optic layer 202 propagating in the x-y plane; and a first acoustic source 206 acoustically coupled to the first acousto-optic layer 202 and configured to deliver a first acoustic energy into the first acousto-optic layer 202 propagating in the x-y plane.

In the illustrated embodiment, the first acousto-optic layer 202 is shown to function as an optical waveguide to optical waves propagating in the x-y plane, and as an acoustic waveguide to acoustic waves propagating in the x-y plane. The first acousto-optic layer 202 is further shown to have an asymmetry about the x-y plane and a front face 238 and a back face 240 both oriented within the x-y plane. As discussed further herein, such asymmetry is suitable to selectively emit the light from the front face 238 of the first acousto-optic layer 202. In an embodiment, the first acousto-optic layer 202 includes thin membrane, or a stack of thin membranes 222 and 224, such as of nanoscale thickness, configured to guide both optical and acoustic waves propagating in the x-y plane of the device 200.

As above, the device 200 includes a light source 204 optically coupled to the first acousto-optic layer 202. In this regard, the light source 204 is configured to deliver light into the first acousto-optic layer 202 propagating in the x-y plane, such as to the intersection 242 discussed further herein. In an embodiment, the light source 204 is configured to emit light in a visible wavelength range, such as between about 400 nm and about 700 nm. In an embodiment, the light source 204 is configured to emit light in a non-visible wavelength range, such as in an infrared range (e.g. between about 700 nm and about 1 micron, in an ultraviolet wavelength range (such as between about 10 nm and about 400 nm), and/or microwave electromagnetic radiation. In an embodiment, the light source 204 includes a laser diode. In an embodiment, the light source 204 is optional.

In the illustrated embodiment, the device 200 further includes a lens 208 integrated into the first acousto-optic layer 202 positioned and configured to direct light in the first acousto-optic layer 202. In an embodiment, the lens 208 is configured to substantially collimate the light. As shown, the lens 208 is optically coupled to a channel waveguide 210 optically coupled to the light source 204, such that light emitted from the light source 204 is directed into the first acousto-optic layer 202. Such a waveguide 210 positioned to receive light from the light source 204 and direct light emitted from the light source 204 to the lens 208.

As above, the device 200 further includes a first acoustic source 206 acoustically coupled to the first acousto-optic layer 202. The first acoustic source 206 is configured to deliver a first acoustic energy into the first acousto-optic layer 202 propagating in the x-y plane, the first acoustic source 206 configured to adjust a wavelength of the first acoustic energy. In the illustrated embodiment, the first acoustic source 206 is an interdigital transducer 214. While interdigital transducers are shown, it will be understood that other forms of acoustic sources 206 are possible and within the scope of the present disclosure.

In the illustrated embodiment, the first acoustic source 206 is shown to further include an edge reflector 216. As shown, the edge reflector 216 is positioned to reflect a portion of the first acoustic energy, in the form of a guided acoustic wave 218, from initially traveling away from the intersection 242 to traveling toward the intersection 242. In this regard, the edge reflector 216 is positioned to increase an amount of acoustic energy toward the intersection 242.

As above, the light source 204 and the first acoustic source 206 are positioned to provide an intersection 242 between the light and the first acoustic energy. In this regard, device 200 is configured to at least partially scatter light from the intersection 242 out of the x-y plane. In an embodiment, an angle of emission of the light, in the form of a steered optical beam 212, from the front face 238 is adjustable by tuning the wavelength of the first acoustic energy, as discussed further herein with respect to FIG. 2B. In an embodiment, the first acoustic source 206 is configured and positioned to provide wavelengths and propagation directions sufficient to satisfy the phase-matching condition of acousto-optic Brillouin scattering, thereby scattering the light out of the x-y plane. As used herein, such "Brillouin scattering" refers to the scattering of optical waves by acoustic waves via the acousto-optic effect. In an embodiment, the light emerging from the front face 238 in an amount that is at least 1% greater (such as greater than 50%, 100%, 500%, 1000%, or more) than the amount emerging from the back face 240 due to the asymmetry of the first acousto-optic layer 202.

The first acousto-optic layer 202 is shown to include two stacked layers 222 and 224 having a first layer 222 of a first acousto-optic material and a second layer 224 of a second acousto-optic material that is different than the first acousto-optic material. In an embodiment, the first or second acousto-optic material are selected from the group consisting of lithium niobate, aluminum nitride, zinc oxide, silicon, and silicon dioxide. In an embodiment, each of the at least two stacked layers 222 and 224 can have a thickness of between 1 nanometer and 1 micrometer. In an embodiment, the at least two stacked layers 222 and 224 can include a plurality of alternating stacked layers alternating between the first acousto-optic material and the second acousto-optic material.

In an embodiment, the first acousto-optic layer 202 is suspended. In an embodiment, the first acousto-optic layer 202 is affixed to a substrate (not shown) via the back face 240. In an embodiment, the substrate is thermally conductive. In an embodiment, the substrate is non-reflective.

By varying the materials and the thicknesses of the acousto-optic layer 202, the device 200 performance can be further fine-tuned and enhanced. For example, with a membrane of a single material suspended in air, due to the mirror symmetry of such a structure, the emitted optical beams may go equally into both the upper and lower sides of the membrane, which is undesirable if single-sided beam emission is preferred. In contrast, a stack of, for example, LN and SiO$_2$ membranes can break the mirror symmetry, due to their different optical and acoustic properties, and suppress the optical emission into the undesired side of the device 200.

Figure 2B:
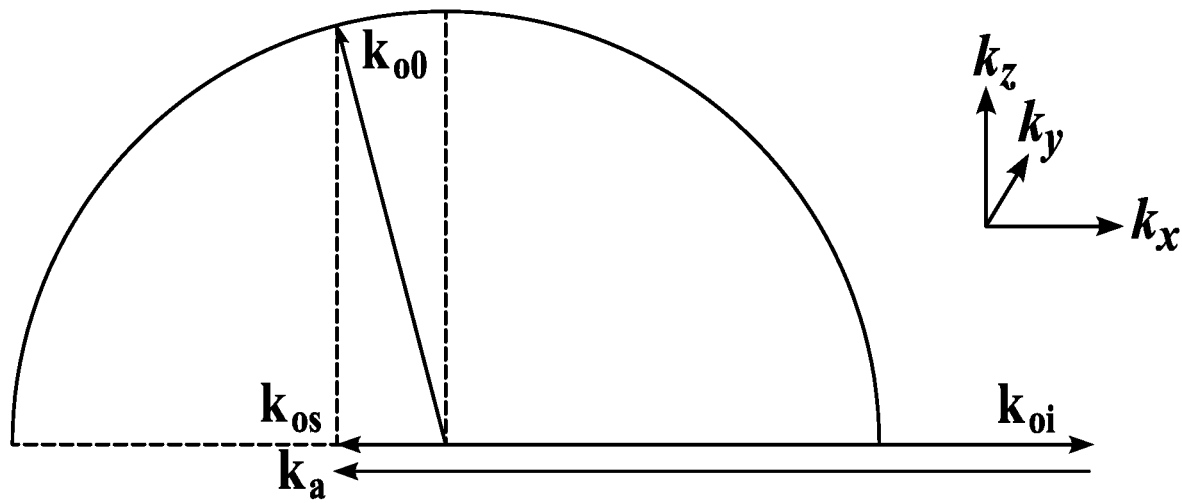
FIG. 2B is a vector representation of physics associated with the device of FIG. 2A, in accordance with an embodiment of the disclosure.
Figure 2B:
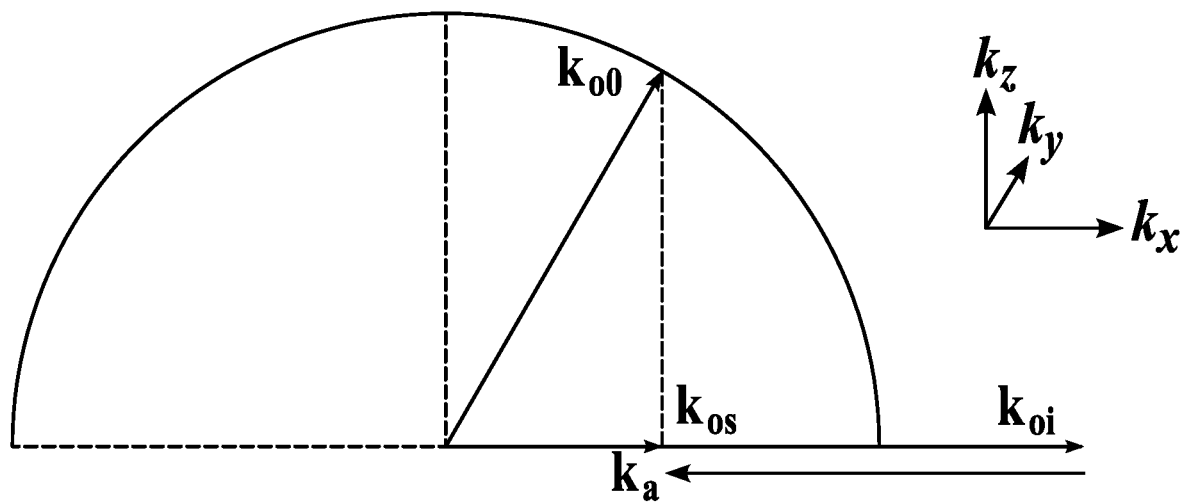

In operation of the device 200 and as shown, the optical wave diverges from the end of the channel optical waveguide 210 on the left side of the device 200, and is collimated by the integrated lens 208. The collimated optical wave propagates in the +x direction as a guided mode of the suspended membrane. Meanwhile, the acoustic wave excited by the acoustic source 206 (as shown the IDT 214) on the right side of the device 200 propagates in the −x direction, also as a guided mode of the suspended membrane. The edge reflector 216 at the backend of the IDT 214 is used to achieve unidirectional acoustic wave excitation and, consequently, double the IDT 214 efficiency. In the center part of the device 200, such as at the intersection 242, the optical wave is scattered by the acoustic wave and emitted into the upper free space. (The emission into the lower free space is ignored here to facilitate the explanation of the basic operation principles.) The wave vector diagram of the Brillouin scattering process is shown in FIG. 2B, which correspond to two cases with different emission directions. The free-space optical, guided optical, guided acoustic wave vectors are denoted as $k_{o0}$, $k_{oi}$, and $k_a$, respectively, while the vector sum of $k_{oi}$ and $k_a$ is denoted as $k_{os}$. As long as the magnitude of $k_{os}$ is smaller than the magnitude of $k_{o0}$, emission into free space can occur, and the direction of $k_{o0}$ is such that its projection in the x-y plane equals $k_{os}$. Therefore, by simply varying the frequency of the acoustic wave, hence varying the magnitude of $k_a$, the direction of the emitted optical beam can be steered in 1D.

To estimate the frequency of the acoustic wave required to achieve beam steering, it suffices to consider the exemplary device 200 configuration for 1D beam steering, shown in FIG. 2A. Here the magnitudes of $k_{o0}$, $k_{oi}$, $k_a$, and $k_{os}$ are denoted as $k_{o0}$, $k_{oi}$, $k_a$, and $k_{os}$, respectively. As discussed above, as long as $k_{os} < k_{o0}$, emission into free space can occur, and the direction of $k_{o0}$ is such that its projection in the x-y plane equals $k_{os}$. Therefore, the angle between $k_{o0}$ and $k_{oi}$, denoted as θ, can be expressed as:

$$\theta = \arccos\frac{k_{oi} - k_a}{k_{o0}} = \arccos\frac{1/\lambda_{oi} - 1/\lambda_a}{1/\lambda_{o0}} = \arccos\frac{1/\lambda_{oi} - f_a/c_a}{1/\lambda_{o0}}$$

where $\lambda_{o0}$, $\lambda_{oi}$, and $\lambda_a$ are the respective wavelengths, while $f_a$ and $c_a$ are the frequency and phase velocity of the acoustic wave, respectively. Consider a representative case where telecommunication laser and a suspended 330-nm-thick MN membrane are used, so that $\lambda_{o0} \approx 1.5$ μm, $\lambda_{oi} \approx 1.0$ μm, and $c_a \approx 10$ km/s. When θ=0°, 90°, and 180°, the respective solutions to the above equation are $f_a \approx 3.3$ GHz, 10.0 GHz, and 16.7 GHz, with $\lambda_a \approx 3.0$ μm, 1.0 μm, and 0.60 μm. Consequently, the electrical signals that drive the IDTs to generate such acoustic waves are at the same frequencies, which generally fall in the microwave frequency range between 1 GHz and 20 GHz. In practice, the IDT center frequency and bandwidth determine the range of θ, hence the FOV, which generally cannot reach the full 0° to 180°. The arguments above can be generalized to the exemplary device 200 configuration for 2D beam steering, shown in FIG. 3A.

In an embodiment, the devices of the present disclosure include two or more acoustic sources. In that regard, attention is directed to FIG. 3A, which shows another exemplary device 300 in accordance with an embodiment of the disclosure, that is capable of steering an emitted optical beam in 2D.

In the illustrated embodiment, the device 300 is shown to include a first acousto-optic layer 302 having a substantially planar shape defining an x-y plane; a light source 304 optically coupled to the first acousto-optic layer 302 and configured to deliver light, in the form of a guided optical wave 320, into the first acousto-optic layer 302 propagating in the x-y plane; and a first acoustic source 306 and a second acoustic source 326 acoustically coupled to the first acousto-optic layer 302 and configured to deliver a first acoustic energy and a second acoustic energy, respectively, into the first acousto-optic layer 302 propagating in the x-y plane.

In the illustrated embodiment, the first acousto-optic layer 302 is shown to function as an optical waveguide to guided optical waves 320 propagating in the x-y plane, and as an acoustic waveguide to guided acoustic waves 318 propagating in the x-y plane. The first acousto-optic layer 302 is further shown to have an asymmetry about the x-y plane and a front face 338 and a back face 340 both oriented within the x-y plane.

As above, the device 300 includes a light source 304 optically coupled to the first acousto-optic layer 302. In this regard, the light source 304 is configured to deliver light into the first acousto-optic layer 302 propagating in the x-y plane, such as to the intersection 342 discussed further herein. In an embodiment, the light source 304 is configured to emit light in a visible wavelength range, such as between about 400 nm and about 700 nm. In an embodiment, the light source 304 is configured to emit light in a non-visible wavelength range, such as in an infrared range (e.g. between about 700 nm and about 1 micron, in an ultraviolet wavelength range (such as between about 10 nm and about 400 nm), and/or microwave electromagnetic radiation.

In the illustrated embodiment, the device 300 further includes a lens 308 integrated into the first acousto-optic layer 302 positioned and configured to direct light in the first acousto-optic layer 302. In an embodiment, the lens 308 is configured to substantially collimate the light. As shown, the lens 308 is optically coupled to a channel waveguide 310 optically coupled to the light source 304, such that light emitted from the light source 304 is directed into the first acousto-optic layer 302. The device 300 is shown to further include a waveguide 210 positioned to receive light from the light source 304 and configured to emit the light for receipt by the lens 308.

As above, the device 300 further includes a first acoustic source 306 and a second acoustic source 326 each acoustically coupled to the first acousto-optic layer 302. The first acoustic source 306 and the second acoustic source 326 are configured to deliver a first acoustic energy and a second acoustic energy, respectively, into the first acousto-optic layer 302 propagating in the x-y plane. In an embodiment, the first acoustic source 306 and the second acoustic source 326 are configured to adjust a wavelength of the first acoustic energy and second acoustic energy, respectively. In the illustrated embodiment, the first acoustic source 306 and second acoustic source 326 are interdigital transducers 314 and 328.

As shown, the second acoustic source 326 is positioned to deliver the second acoustic energy to the intersection 342, thereby providing the intersection 342 between the light, the first acoustic energy, and the second acoustic energy. In an embodiment, the second acoustic source 326 comprises second interdigital transducer 328 disposed on a second piezoelectric membrane.

In the illustrated embodiment, the first acoustic source 306 and the second acoustic source 326 each respectively include edge reflectors 316 and 330. As discussed further herein with respect to FIG. 2A, such edge reflectors 316 and 330 are configured and positioned to reflect a portion of the first and second acoustic energy, respectively, from initially traveling away from the intersection 342 to traveling toward the intersection 342.

As above, the light source 304, the first acoustic source 306, and the second acoustic source 326 are positioned to provide an intersection 342 between the light and the first acoustic energy. In this regard, device 300 is configured to at least partially scatter light from the intersection 342 out of the x-y plane. In an embodiment, an angle of emission of the light, in the form of a steered optical beam 312, from the front face is adjustable by tuning the wavelength of the first acoustic energy and the second acoustic energy, as discussed further herein with respect to FIG. 3B. In an embodiment, the first and second acoustic sources 306 and 326 are configured and positioned to provide wavelengths and propagation directions sufficient to satisfy the phase-matching condition of acousto-optic Brillouin scattering, thereby scattering the light out of the x-y plane. In an embodiment, the light emerging from the front face 338 in an amount that is at least 1% greater (such as greater than 50%, 100%, 500%, 1000%, or more) than the amount emerging from the back face 340 due to the asymmetry of the first acousto-optic layer 302.

The first acousto-optic layer 302 is shown to include two stacked layers 322 and 324 having a first layer 322 of a first acousto-optic material and a second layer 324 of a second acousto-optic material that is different than the first acousto-optic material. In an embodiment, the first or second acousto-optic materials are selected from the group consisting of lithium niobate, aluminum nitride, zinc oxide, silicon, and silicon dioxide. In an embodiment, each of the at least two stacked layers 322 and 324 can have a thickness of between 1 nanometer and 1 micrometer. In an embodiment, the at least two stacked layers 322 and 324 can include a plurality of alternating stacked layers alternating between the first acousto-optic material and the second acousto-optic material.

In an embodiment, the first acousto-optic layer 302 is suspended. In an embodiment, the first acousto-optic layer 302 is affixed to a substrate via the back face 340 (not shown). In an embodiment, the substrate is thermally conductive. In an embodiment, the substrate is non-reflective.

Figure 3B:
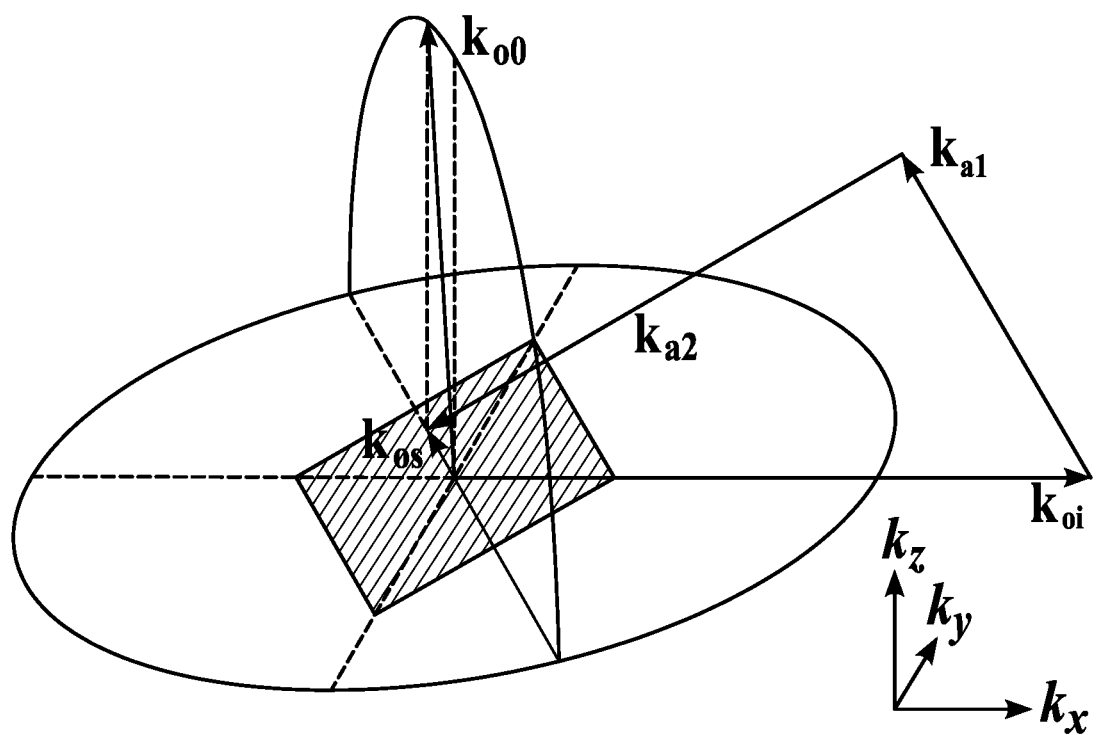
FIG. 3B is a vector representation of physics associated with the device of FIG. 3A, in accordance with an embodiment of the disclosure.
Figure 3B:
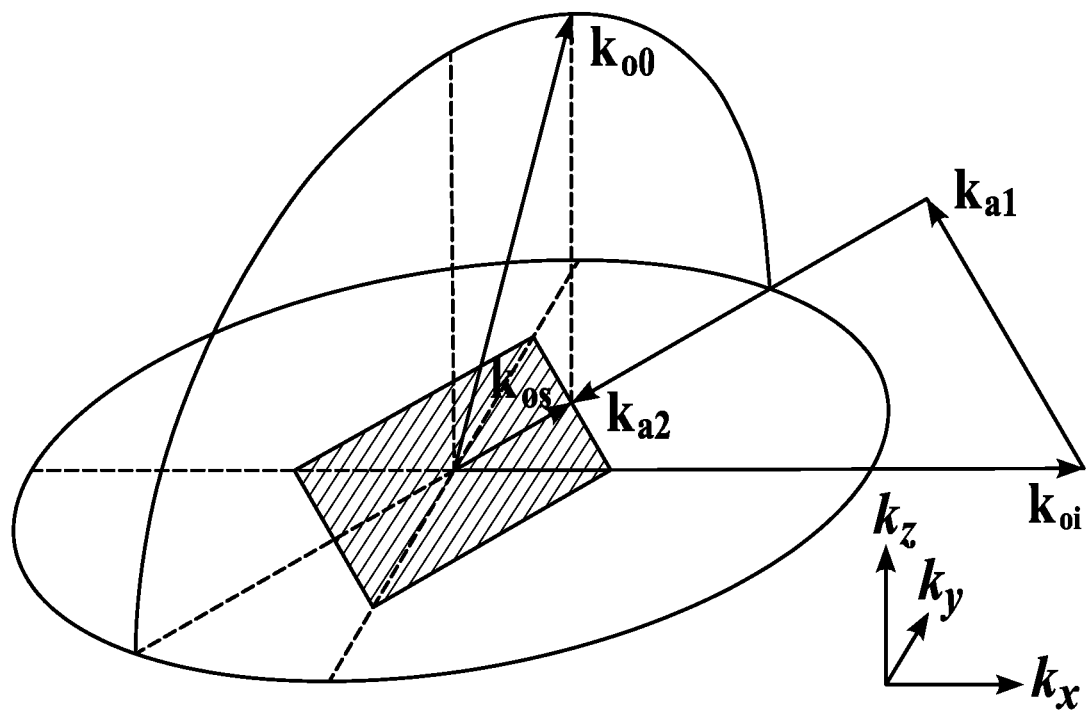

Operation of device 300 is schematically illustrated in FIG. 3B. As shown, two guided acoustic waves are excited by the two acoustic sources 306 and 326 (as shown, including the two IDTs 314 and 328) on the right side of the device 300, and propagate in the directions that are +60° and −60° with respect to the −x direction. As shown in FIG. 3B, the two guided acoustic wave vectors are denoted as $k_{a1}$ and $k_{a2}$, and $k_{os}$ now denotes the vector sum of $k_{oi}$, $k_{a1}$ and $k_{a2}$. The shaded area represents the range within which $k_{os}$ can be varied by independently varying the magnitudes of $k_{a1}$ and $k_{a2}$. Similar to the case shown in FIG. 2B, as long as the magnitude of $k_{os}$ is smaller than the magnitude of $k_{o0}$, emission into free space can occur, and the direction of $k_{o0}$ is such that its projection in the x-y plane equals $k_{os}$. Therefore, by independently varying the frequencies of the two acoustic waves, hence independently varying the magnitudes of $k_{a1}$ and $k_{a2}$, the direction of the emitted optical beam can be steered in 2D.

Figure 4A:
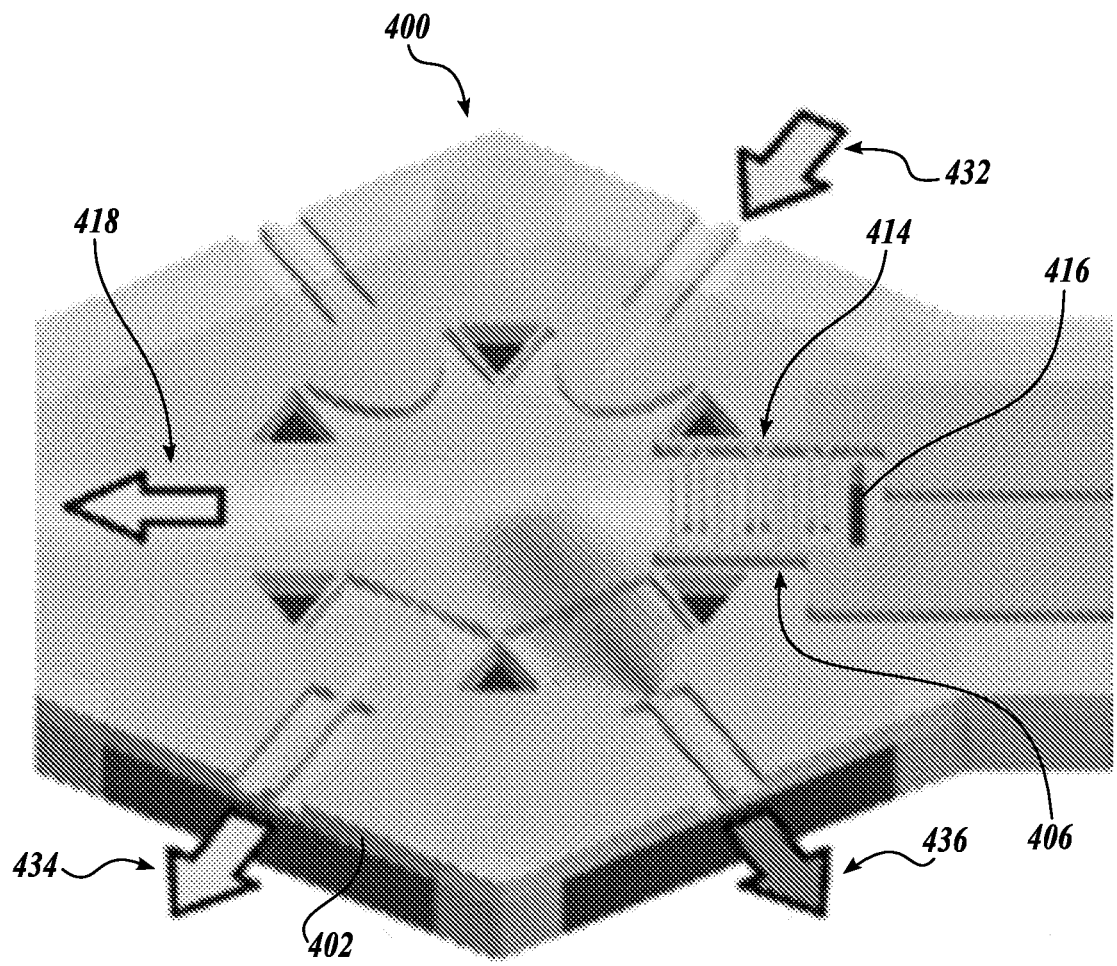
FIG. 4A is perspective view of a schematic representation of a device, in accordance with an embodiment of the disclosure.
Figure 4B:
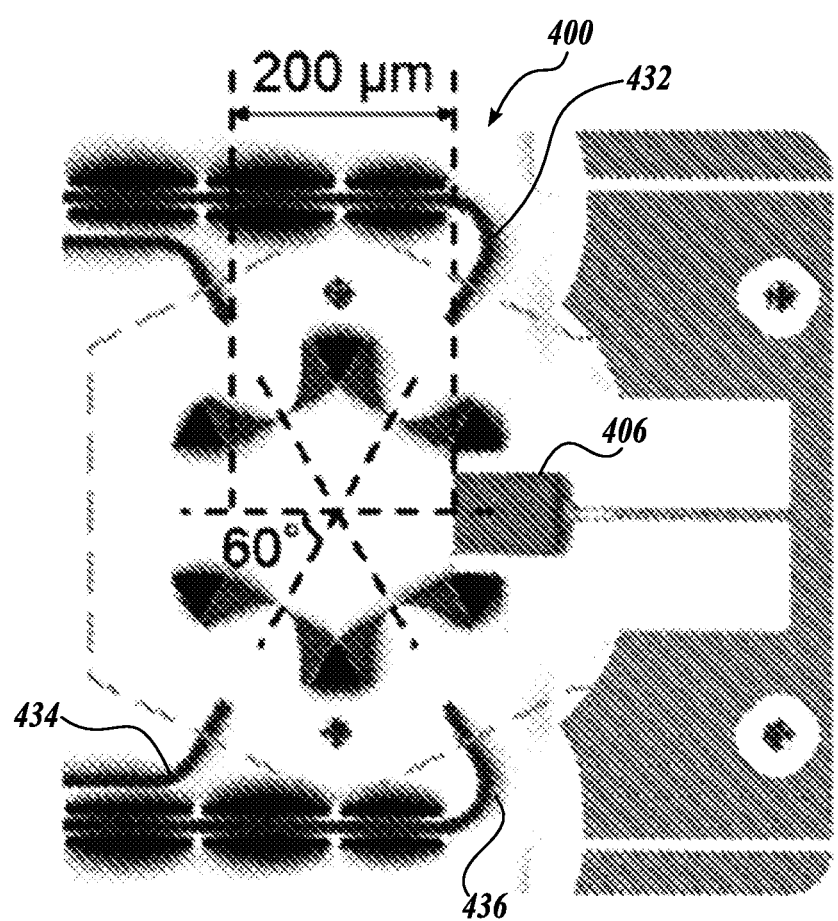
FIG. 4B is an optical microscope image showing a top-down plan view of a device according to the embodiment of FIG. 4A.
Figure 4C:
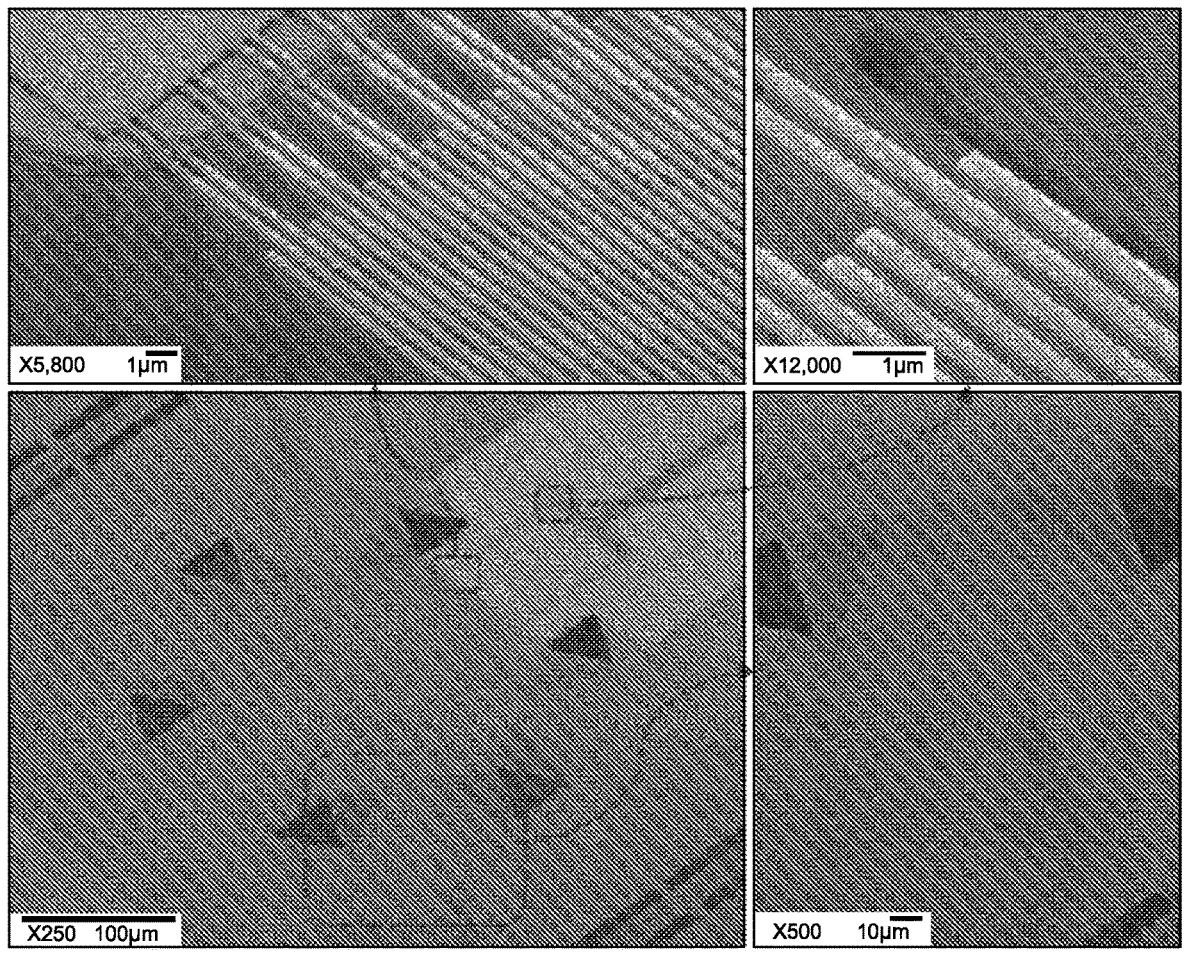
FIG. 4C is a scanning electron microscope (SEM) image (bottom left) of a device according to the embodiment of FIG. 4A with magnified views of portions of the device (top left, top right, bottom right).

FIGS. 4A-4C show respectively a schematic illustration, an optical microscope image, and scanning electron microscope (SEM) images of a device 400 in accordance with an embodiment of the disclosure. As shown, the device 400 includes a first acousto-optic layer 402 having a substantially planar shape defining an x-y plane shaped to receive input light 432 from a light source optically coupled to the first acousto-optic layer 402 and configured to deliver light 432 into the first acousto-optic layer 402 propagating in the x-y plane, and a first acoustic source 406, including interdigital electrode 414 and edge reflector 416, acoustically coupled to the first acousto-optic layer 402 and configured to deliver a first acoustic energy 418 into the first acousto-optic layer 402 propagating in the x-y plane. In operation, input light 432 and acoustic energy from first acoustic source 402 interact to scatter light, resulting transmitted light 434 and deflected light 436, such as according to the principles discussed further herein with respect to FIGS. 2B and 3B.

In the illustrated embodiment, the first acousto-optic layer 402 is a suspended 330-nm-thick MN membrane. As shown in FIG. 4A, the first acousto-optic layer 402 includes 4 channel optical waveguides, 4 integrated lenses, a first acoustic source 406 including an IDT 414 and an edge reflector 416. In an embodiment, these components are the same as, similar to, or analogous to components discussed further herein with respect to FIGS. 2A, 2B, 3A, and 3B. The channel optical waveguides and the integrated lenses were shallow etched into the AlN membrane. The IDT 414 was formed by metal deposition on top of the AlN membrane. The acoustic reflector 416 was through-etched into the AlN membrane.

Various existing technologies will now be described for comparison with the devices of the present disclosure.

Mechanical LIDAR is a highly matured technology based on mechanical beam steering, and has been widely deployed on autonomous vehicles and drones. A vertical linear array of lasers is mounted on a rotating stage to achieve 2D LIDAR operations. Although the rotating stage can provide horizontal FOV up to a full 360°, the maximum rotation frequency of the stage is only 20 Hz.

MEMS LIDAR provides an intrinsically slow steering velocity. The integrated AO solution of the present disclosure features much higher steering velocity than conventional MEMS solutions, which are intrinsically slow. The devices of the present disclosure also provide 2D random access capability, while conventional MEMS solutions can only operate in raster scanning mode. Flash LIDAR does not involve beam steering, but provides a combination of all the desired features for LIDAR, except that the resolution is intrinsically very low, due to the difficulties in scaling up. High resolution is required in many important applications, which our solution can achieve with moderate cost.

Electro-optic liquid-crystal LIDAR combines two different EO LC technologies, namely Steerable Electro-Evanescent Optical Refractors (SEEORs) and polarization gratings (PGs). SEEOR features a large horizontal FOV, up to 120°, which has never been achieved using EO or AO solutions. The power consumption for this solution is also very low. However, the vertical FOV of SEEOR is only less than 20°. To increase the vertical FOV, PGs and other free-space optical components are installed in front of the SEEOR to provide further beam steering in discrete steps, increasing the vertical FOV to 120°. In contrast, the devices of the present disclosure naturally provide 2D steering capability with large FOV in both dimensions, without the need for extra free-space optical components.

TO optical phased array (OPA) have been previously described. Currently, the TO OPA operation requires an expensive tunable laser and high-power consumption to achieve 2D beam steering, while the devices of the present disclosure are much less expensive and consume much less power.

EO/TO OPA solutions have been previously described. The operation principles of this EO/TO OPA solution are very similar to those of the TO OPA solution developed by Analog Photonics mentioned above. Both OPA solutions currently require high power consumption to achieve 2D beam steering. Especially, this OPA even requires water cooling to operate. This solution aims at the full integration of all the LIDAR components on the silicon chip, including the tunable lasers. The performance and tuning range of the integrated tunable lasers are currently not as good as an external off-the-shelf tunable laser source, but is much less expensive. Both OPA solutions suffer from the presence of side lobes, which are the optical emission into directions other than the desired one, while the devices of the present disclosure can completely avoid the side lobes. The device control of this OPA solution is very complicated and scales linearly with the array size, while the device control of our AO solution is elegant and straightforward. This OPA solution features an integrated lens and a photodiode array, which can provide real-time feedback for the beam steering angle in 1D. Meanwhile, in the AO devices of the present disclosure, the residue optical emission into the undesired side can be used as the feedback for the beam steering angle in 2D, which may be more advantageous.

TABLE 1 is a comparison of the solutions described in the several preceding paragraphs, as compared with the solution described in the present disclosure (which is denoted by "AO").

TABLE 1

Comparisons between different beam steering solutions

| Solution | FOV, resolution and steering speed* | | Power consumption* | Steering type |
|---|---|---|---|---|
| | Horizontal | Vertical | | |
| Mechanical | 360° | 30°~40° | A few or tens of watts (Overall†) | Raster scan |
| | >0.08° | >0.4° | | |
| | <7200°/s | Non-steering | | |
| MEMS | 60° | 20° | Milliwatts‡ (Steering only) | Raster scan |
| | 0.25° | 0.3° | | |
| | ~60,000°/s‡ | Non-steering | | |
| Flash | 60° | 16° | A few watts (Overall†) | Non-steering |
| | 2° | 2° | | |
| | Non-steering | Non-steering | | |
| EO LC | <120° | <20° × 6 | Milliwatts (Steering only) | Random access |
| | ~0.05° | ~0.05° | | |
| | Millions of °/s | Millions of °/s | | |

TABLE 1-continued

Comparisons between different beam steering solutions

| Solution | FOV, resolution and steering speed* | | Power consumption* | Steering type |
|---|---|---|---|---|
| | Horizontal | Vertical | | |
| TO OPA | 46° | 36° | A few watts or tens of watts (Steering only) | Random access |
| | 0.02° | 0.02° | | |
| | No data | No data | | |
| EO/TO OPA | 23° | 3.6° | A few watts or tens of watts (Steering only) | Random access |
| | 1° | 0.6° | | |
| | Millions of °/s† | No data | | |
| AO | 60° | 60° | Milliwatts (Steering only) | Random access |
| | 0.1° | 0.1° | | |
| | Millions of °/s | Millions of °/s | | |

*These data only reflect representative performance of the beam steering solutions. For specific performance data, please refer to the product datasheets, if available.
†Overall power consumption of the final product includes light source and detector, beam steering, as well as data processing and transmission.
‡This is our estimation. Official data are not available.

Methods

In another aspect, the present disclosure provides methods of using and making acousto-optical devices.

In an embodiment, the method is performed using an AO device of the present disclosure, such as one of the devices 200, 300, and 400 described further herein with respect to FIGS. 2A, 2B, 3A, 3B, and 4A-4C. In an embodiment, the method includes directing light from a light source, such as a light source of the AO device, and first acoustic energy from a first acoustic energy source, such as a first acoustic energy source of the AO device, to an intersection of the AO, thereby initiating scattering of the light causing at least a portion of the light to emerge from a front face of the AO device. In an embodiment, the emitted light is non-visible light, such as is discussed further herein.

In an embodiment, the method includes directing second acoustic energy from a second acoustic source to the intersection. As discussed further herein, such first and second acoustic energy are suitable to steer the emitted light in one and/or two dimensions, such as through modulation or adjustment of a frequency of the first and second acoustic energy. In this regard, in an embodiment, the method includes adjusting a frequency of acoustic energy emitted from the first acoustic source and/or the second acoustic source, the adjust an angle of light emitted from the device. In an embodiment, the light emitted from the light source includes visible light. In an embodiment, the light emitted from the light source includes non-visible light.

In an embodiment, the methods of the present disclosure include a method of a method of making an acousto-optic device according to any of the embodiments of the present disclosure. In an embodiment, the method comprises fabricating and/or assembling the components of the acousto-optic device and arranging them in the fashion described in the present disclosure.

The particular aspects disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular aspects disclosed above may be altered or modified and all such variations are considered within the scope and spirit of the technology. Accordingly, the protection sought herein is as set forth in the claims below.

The embodiments of the invention in which an exclusive property or privilege is claimed are defined as follows:

1. An acousto-optic device comprising:
    a first acousto-optic layer having a substantially planar shape defining an x-y plane, the first acousto-optic layer functioning as an optical waveguide to optical waves propagating in the x-y plane, the first acousto-optic layer functioning as an acoustic waveguide to acoustic waves propagating in the x-y plane, the first acousto-optic layer having an asymmetry about the x-y plane, the first acousto-optic layer having a front face and a back face both oriented within the x-y plane, wherein the first acousto-optic layer comprises at least two stacked layers comprising a first layer of a first acousto-optic material and a second layer of a second acousto-optic material that is different than the first acousto-optic material;
    a light source optically coupled to the first acousto-optic layer and configured to deliver light into the first acousto-optic layer propagating in the x-y plane; and
    a first acoustic source acoustically coupled to the first acousto-optic layer and configured to deliver a first acoustic energy into the first acousto-optic layer propagating in the x-y plane, the first acoustic source configured to adjust a wavelength of the first acoustic energy,
    the light source and the first acoustic source are positioned to provide an intersection between the light and the first acoustic energy,
    the light at least partially scattering from the intersection out of the x-y plane, and
    the light emerging from the front face in an amount that is at least 1% greater than the amount emerging from the back face due to the asymmetry of the first acousto-optic layer.

2. The acousto-optic device of claim 1, wherein the first acousto-optic layer has a thickness of between 1 nanometer and 10 micrometers.

3. The acousto-optic device of claim 1, wherein the first acousto-optic material is selected from the group consisting of lithium niobate, aluminum nitride, zinc oxide, silicon, and silicon dioxide.

4. The acousto-optic device of claim 1, wherein the second acousto-optic material is selected from the group consisting of lithium niobate, aluminum nitride, zinc oxide, silicon, and silicon dioxide.

5. The acousto-optic device of claim 1, wherein each of the at least two stacked layers has a thickness of between 1 nanometer and 1 micrometer.

6. The acousto-optic device of claim 1, wherein the at least two stacked layers include a plurality of alternating stacked layers alternating between the first acousto-optic material and the second acousto-optic material.

7. The acousto-optic device of claim 1, the light emerging from the front face in an amount that is at least 50% greater than the amount emerging from the back face due to the asymmetry of the first acousto-optic layer.

8. The acousto-optic device of claim 1, wherein the first acoustic source is configured and positioned to provide wavelengths and propagation directions sufficient to satisfy a phase-matching condition of acousto-optic Brillouin scattering, thereby scattering the light out of the x-y plane.

9. The acousto-optic device of claim 1, the acousto-optic device further comprising a lens configured to substantially collimate the light.

10. The acousto-optic device of claim 1, wherein the first acoustic source comprises interdigital transducers disposed on a piezoelectric membrane.

11. The acousto-optic device of claim 10, wherein the first acoustic source comprises an edge reflector positioned to reflect a portion of the first acoustic energy from initially traveling away from the intersection to traveling toward the intersection.

12. The acousto-optic device of claim 1, wherein the first acousto-optic layer is affixed to a substrate, wherein the substrate is thermally conductive, and wherein the substrate is non-reflective.

13. The acousto-optic device of claim 1, wherein an angle of emission of the light from the front face is adjustable by tuning the wavelength of the first acoustic energy.

14. The acousto-optic device of claim 1, the acousto-optic device further comprising a second acoustic source acoustically coupled to the first acousto-optic layer and configured to deliver a second acoustic energy into the first acousto-optic layer propagating in the x-y plane, the second acoustic source configured to adjust a wavelength of the second acoustic energy, the second acoustic source positioned to deliver the second acoustic energy to the intersection, thereby providing the intersection between the light, the first acoustic energy, and the second acoustic energy.

15. The acousto-optic device of claim 14, wherein the second acoustic source comprises second interdigital transducers disposed on a second piezoelectric membrane.

16. The acousto-optic device of claim 14, wherein the second acoustic source comprises a second edge reflector positioned to reflect a portion of the second acoustic energy from initially traveling away from the intersection to traveling toward the intersection.

17. The acousto-optic device of claim 14, wherein the first and second acoustic sources can be configured and positioned to provide wavelengths and propagation directions sufficient to satisfy the phase-matching condition of acousto-optic Brillouin scattering, thereby scattering the light out of the x-y plane.

18. A method of using the acousto-optic device of claim 1, the method comprising:
directing the light from the light source and the first acoustic energy from the first acoustic energy source to the intersection, thereby initiating scattering of the light causing the at least a portion of the light to emerge from the front face.

19. An acousto-optic device comprising:
a first acousto-optic layer having a substantially planar shape defining an x-y plane, the first acousto-optic layer functioning as an optical waveguide to optical waves propagating in the x-y plane, the first acousto-optic layer functioning as an acoustic waveguide to acoustic waves propagating in the x-y plane, the first acousto-optic layer having an asymmetry about the x-y plane, the first acousto-optic layer having a front face and a back face both oriented within the x-y plane;
a light source optically coupled to the first acousto-optic layer and configured to deliver light into the first acousto-optic layer propagating in the x-y plane;
a lens configured to substantially collimate the light; and
a first acoustic source acoustically coupled to the first acousto-optic layer and configured to deliver a first acoustic energy into the first acousto-optic layer propagating in the x-y plane, the first acoustic source configured to adjust a wavelength of the first acoustic energy,
the light source and the first acoustic source are positioned to provide an intersection between the light and the first acoustic energy,
the light at least partially scattering from the intersection out of the x-y plane, and
the light emerging from the front face in an amount that is at least 1% greater than the amount emerging from the back face due to the asymmetry of the first acousto-optic layer.

20. An acousto-optic device comprising:
a first acousto-optic layer having a substantially planar shape defining an x-y plane, the first acousto-optic layer functioning as an optical waveguide to optical waves propagating in the x-y plane, the first acousto-optic layer functioning as an acoustic waveguide to acoustic waves propagating in the x-y plane, the first acousto-optic layer having an asymmetry about the x-y plane, the first acousto-optic layer having a front face and a back face both oriented within the x-y plane;
a light source optically coupled to the first acousto-optic layer and configured to deliver light into the first acousto-optic layer propagating in the x-y plane;
a first acoustic source acoustically coupled to the first acousto-optic layer and configured to deliver a first acoustic energy into the first acousto-optic layer propagating in the x-y plane, the first acoustic source configured to adjust a wavelength of the first acoustic energy; and
a second acoustic source acoustically coupled to the first acousto-optic layer and configured to deliver a second acoustic energy into the first acousto-optic layer propagating in the x-y plane, the second acoustic source configured to adjust a wavelength of the second acoustic energy, the second acoustic source positioned to deliver the second acoustic energy to the intersection, thereby providing the intersection between the light, the first acoustic energy, and the second acoustic energy,
the light source and the first acoustic source are positioned to provide an intersection between the light and the first acoustic energy,
the light at least partially scattering from the intersection out of the x-y plane, and
the light emerging from the front face in an amount that is at least 1% greater than the amount emerging from the back face due to the asymmetry of the first acousto-optic layer.

* * * * *